(12) United States Patent
Nikander

(10) Patent No.: US 7,155,500 B2
(45) Date of Patent: Dec. 26, 2006

(54) IP ADDRESS OWNERSHIP VERIFICATION MECHANISM

(75) Inventor: Pekka Nikander, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 651 days.

(21) Appl. No.: 10/091,288

(22) Filed: Mar. 6, 2002

(65) Prior Publication Data

US 2002/0133607 A1  Sep. 19, 2002

(30) Foreign Application Priority Data

Mar. 16, 2001  (GB) ................................ 0106559.8

(51) Int. Cl.
*G06F 15/173* (2006.01)
*G06F 7/04* (2006.01)

(52) U.S. Cl. .......................................... 709/223; 726/26

(58) Field of Classification Search ................ 709/223; 370/395.32; 711/216; 379/142.05; 386/23, 386/229; 455/411; 706/67; 713/155, 171–176; 726/26

See application file for complete search history.

(56) References Cited

U.S. PATENT DOCUMENTS

| | | | | |
|---|---|---|---|---|
| 4,701,745 | A | * | 10/1987 | Waterworth ................... 341/63 |
| 5,032,987 | A | * | 7/1991 | Broder et al. ................. 711/221 |
| 5,351,295 | A | * | 9/1994 | Perlman et al. .............. 713/162 |
| 5,651,069 | A | * | 7/1997 | Rogaway ..................... 380/28 |
| 5,684,951 | A | * | 11/1997 | Goldman et al. ............... 726/6 |
| 5,856,267 | A | * | 1/1999 | Sherman et al. ............. 503/227 |
| 5,872,917 | A | * | 2/1999 | Hellman ...................... 713/202 |
| 5,958,053 | A | * | 9/1999 | Denker ........................ 713/201 |
| 6,009,528 | A | | 12/1999 | Teraoka |
| 6,101,499 | A | * | 8/2000 | Ford et al. .................... 707/10 |
| 6,542,508 | B1 | * | 4/2003 | Lin ........................ 370/395.43 |
| 6,859,791 | B1 | * | 2/2005 | Spagna et al. ................ 705/51 |
| 6,904,456 | B1 | * | 6/2005 | Cox ........................... 709/219 |

FOREIGN PATENT DOCUMENTS

| GB | 2 313 272 A | 11/1997 |
|---|---|---|
| GB | 2 348 569 A | 10/2000 |

OTHER PUBLICATIONS

Internet Draft: Privacy extensions for stateless address auto-configuration in IPV6, Thomas Narten, IBM, Jun. 1999.*
Design and analysis of the Secure Border Gateway Protocol (S-BGP), Kent, S.; Lynn, C.; Seo, K., DARPA Info. Survivability Conf. and Exposition 2000 Proceed. Jan. 2000, vol. 1, p. 1-16.*
Secure Border Gateway Protocol (S-BGP), Kent, S.; Lynn, C.; Seo, K., BBN Technol, Cambridge, MA, ISSN 073-8716, Apr. 2000, p. 582-592.*

(Continued)

*Primary Examiner*—Beatriz Prieto
(74) *Attorney, Agent, or Firm*—Nixon & Vanderhye, P.C.

(57) ABSTRACT

A method of verifying that a host coupled to an IP network is authorised to use an IP address which the host claims to own, the IP address comprising a routing prefix and an interface identifier part. The method comprises receiving from the host one or more components, applying a one-way coding function to the or each component and/or derivatives of the or each component, and comparing the result or a derivative of the result against the interface identifier part of the IP address. If the result or its derivative matches the interface identifier the host is assumed to be authorised to use the IP address and if the result or its derivative does not match the interface identifier the host is assumed not to be authorised to use the IP address.

15 Claims, 3 Drawing Sheets

OTHER PUBLICATIONS

An Adress "Ownership" Problem in IPV6: How to handle authorization in IPV6 signalling mechanism that affect routing, Nikander, P., Feb. 2001, p. 1-19.*

Narten, "RFC 3041: Privacy Extensions for Stateless Address Autoconfiguration in Ipv6", IETF Network Working Group, Jan. 1-31, 2001, pp. 1-17.

"IPV6—Internet Der Zukunft", Funkschau, Franzis-Verlag K.G. Munchen, DE, No. 2, Jan. 3, 1997, pp. 50-53.

Bradner et al, "A Framework for Purpose Built Keys (PBK)", IETF Network Working Group, Feb. 1-28, 2001, pp. 1-8.

* cited by examiner

IP ADDRESS OWNERSHIP VERIFICATION MECHANISM

FIELD OF THE INVENTION

The present invention relates to address mechanisms in Internet Protocol (IP) and more particularly to address mechanisms in IPv6.

RELATED ART AND OTHER CONSIDERATIONS

The massive growth in the use of the Internet has exposed weaknesses and limitations of the current Internet protocol known as IPv4. The Internet Engineering Task Force (IETF), which is a loose connection of interested parties, is therefore developing an enhanced Internet protocol known as IPv6. In particular, IPv6 incorporates much improved security mechanisms known as IPSec which enable two or more parties to communicate securely over the Internet, as well as provisions for mobile Internet access (mobileIP). MobileIP allows users to access the Internet on the move, roaming from one IP access node to another. MobileIP will be used in particular by those accessing the Internet via wireless mobile devices (connected for example to wireless LANs and cellular telephone networks).

IPv6 provides for a much larger IP address space, providing IP addresses of 128 bits in length. The first 64 bits of an address form a routing prefix which uniquely identifies the Internet access node (or so-called "local link") used by an IP terminal or host, whilst the last 64 bits form a host suffix which uniquely identifies the mobile terminal to the access node (or within the local link). The host suffix is referred to as an "interface identifier" as it identifies the host uniquely over the access interface. Typically, when a host registers with an access node, the host learns the routing prefix of the access node from an advertisement message sent from the access node. According to RFC3041 (IETF), a host then generates its interface identifier using a random number generated by the host. The host may additionally use a link layer address to generate the interface identifier, the link layer address being for example a MAC layer address used by the access network.

A potential problem with this approach is that two hosts connected to the same access node (and therefore having the same routing prefix) may generate the same interface identifiers and therefore the same IP addresses. This cannot be allowed. IPv6 therefore provides a mechanism known as Duplicate Address Detection (DAD). Once a host has generated a potential IP address, it sends a neighbour solicitation message containing the proposed IP address to the access node or directly to the local link if the local link provides for local broadcast or multicast. If required, the access node broadcasts the message to all other hosts connected to the node. If a host receiving the message recognises the IP address contained in the message as an address which it has already adopted, that hosts responds by sending to the soliciting host a neighbour advertisement. If a soliciting host does not receive a neighbour advertisement message within some predefined time, it will adopt the generated address. If on the other hand a neighbour advertisement is received within the predefined time, the soliciting host will generate a new interface identifier and IP address, and repeat the solicitation process.

A problem with the approach described above is that it can be relatively simple for malicious third party to deny the soliciting node access by always responding to a neighbour solicitation message with a neighbour advertisement message. This kind of attack is known as a "denial of service" attack.

A further problem can arise in IPv6 with mobileIP. As already mentioned, mobileIP allows hosts to roam between access nodes and even access networks, a feature which requires that hosts be allowed to change the IP addresses which define their current physical locations. Typically, a mobile host is allocated a "fixed" home IP address in a home network. When the host is at home, it can use this home address as its physical address. However, when a host attaches itself to a "foreign" access node, the host is allocated a temporary care-of-address. Hosts corresponding with the mobile host maintain a binding cache containing mappings between home addresses and care-of-addresses. For incoming packets, the mobileIP layer at a correspondent host exchanges the care-of-address for the home address in the destination field, whilst for outgoing packets the mobile IP layer at a correspondent host exchanges the home address for the care-of-address in the destination address field. When a mobile host obtains a new care-of-address, it must send a binding update message to all correspondent hosts in order to update their binding caches.

A potential risk of this mechanism is that a malicious third party may be able to send a falsified binding update to a correspondent host to cause data packets intended for a mobile host to be routed to the malicious party. If the packets are then forwarded to the mobile host by the malicious party (after being opened and read by that party), the mobile host may not even know that its packets are being re-routed and read. This problem is not limited to mobileIP, but is also present in other signalling functions within the IPv6 architecture. The mobileIP related problem and some of the other problems are described in more detail in the IETF submission "draft-nikander-ipng-address-ownership-00.txt" of February 2001.

A solution to this problem has been proposed in the IETF submission "draft-bradner-pbk-frame-00.txt" of February 2001. This involves generating at the mobile host a purpose built key (PBK) pair comprising a public and a private key. An Endpoint ID (EID) is generated at the mobile host by applying a hash to the public key. The EID is sent to a correspondent host soon after initiation of an IP connection. Subsequently, the mobile host sends to the correspondent host the public key—the correspondent host is able to verify that the public key "belongs" to the connection by applying the one-way coding function to the key and comparing the result with the previously received EID. Any binding update which is subsequently sent, is signed at the mobile host with the host's private key. The correspondent host verifies the signature attached to the binding update using the previously received public key.

BRIEF SUMMARY

Two problems with IPv6 have been considered above, namely the possibility of a denial of service attack being launched by the sending of neighbour advertisement messages to a soliciting host, and a "man-in-the-middle" attack based upon falsification of binding updates. Similar problems might arise in the following situations; ICMP Router discovery (RFC2461 Section 6.1.2), ICMP Redirect (RFC2461 Section 8.1), Generic Tunnelling (RFC2473), IPsec Tunnelling (RFC2401), Router Renumbering (RFC2894), IPv6 Routing Header (RFC2460 Section 8.4), and possibly in the Inverse Neighbour Discovery (draft-ietf-ion-ipv6-ind-05.txt) and SCTP (RFC2960). It may also arise in the HIP proposal, as well as a number of other proposals. All of these problems have a common cause—it is not possible to verify the ownership of an IP address.

Considering the proposal by Bradner, the PBK does not bind the public key to an IP address but rather only to the EID. Furthermore, there is no direct binding between the EID and the IP address. Thus, the PBK does not directly remedy the problems described.

It is an object of the present invention to overcome the above noted problems. In particular it is an object of the present invention to provide a means for proving ownership of an IP address. In this document, ownership of an IP address denotes that the owner is authorised to use the IP address within the specified scope of the address and is authorised to change routing information that applies to the IP address.

According to a first aspect of the present invention there is provided a method of verifying that a host coupled to an IP network is authorised to use an IP address which the host claims to own, the IP address comprising a routing prefix and an interface identifier part, the method comprising receiving from the host one or more components, applying a one-way coding function to the or each component and/or derivatives of the or each component, and comparing the result or a derivative of the result against the interface identifier part of the IP address, wherein if the result or its derivative matches the interface identifier the host is assumed to be authorised to use the IP address and if the result or its derivative does not match the interface identifier the host is assumed not to be authorised to use the IP address.

It will be appreciated that a host will generate the interface identifier part of its IP address using the component(s) and/or derivatives of the component(s). Where a plurality of components are involved, the one-way coding function may be applied to a combination of certain of the components and derivatives of others of the components. The generating host will retain these components during a connection and will be able to provide them to some other party when required. That other party can use the components to reconstruct the interface identifier and verify the ownership of the IP address by the host. It is difficult for a malicious third party to reverse the coding and recover the components from the IP address, and therefore to impersonate the true owner of an address.

Said one-way coding function may be SHA-1, MD5, or any other cryptographically known one-way coding function.

An advantage of embodiments of the present invention is that they do not require any global infrastructure, such as Public Key Infrastructure (PKI), but are based on a novel application of cryptographic functions. Furthermore, since certain embodiments of this invention do not require any architectural changes to the currently proposed IPv6 specifications, the present invention is more advantageous than the Bradner proposal considered above, which would require changes in the currently proposed IPv6 architecture.

The IP network may comprise the Internet, or a private IP network such as a corporate LAN or WAN. The IP network may comprise an access network coupled to the Internet and/or a private IP network.

Preferably, said components comprise a public key or a digest of a public key generated by said host or issued to said host by some other party, or a fixed (e.g. zero) bit sequence of the same length, and a hash value being one of a sequence of related hash values. Alternatively or in addition, said components comprise an initial interface identifier which corresponds to or is derived from a link layer address of the host, or a fixed (e.g. zero) bit sequence of the same length. More preferably, said components comprise both said public key or said digest of a public key and said initial interface identifier which corresponds to or is derived from a link layer address of the host, or a fixed (e.g. zero) bit sequence of the same length. More preferably, said components comprise a counter value which identifies the position of the received hash value in said sequence.

Preferably, said series of hash values are derived at the host by applying a one-way coding function to a seed value, said public key or digest of the public key, and said initial interface identifier. Alternatively, said series of hash values are derived at the host by applying a one-way coding function to said seed value and either said public key or digest of the public key, or said initial interface identifier. The hash value which is derivable from the received hash value, and which is used to generate said result, is the last hash value in the sequence. In the event of a first IP address verification, the hash value received from the host is the hash value preceding the final hash value in the sequence. For each subsequent verification process, the next previous hash value must be received.

Preferably, the method comprises deriving the final value of the hash sequence and applying a one-way coding function to that final value concatenated with one or more other components. The result may be further processed, before comparing the final result with the interface identifier.

According to a second aspect of the present invention there is provided a method of generating an IP address at a host, the IP address comprising a routing prefix and an interface identifier part, the method comprising generating the interface identifier part by applying a one-way coding function to one or more components.

Preferably, said components include a hash value which is generated through some method that uses information from a random number. More preferably, the hash value is generated by applying a one-way coding function to a combination of the random number and an initial interface identifier, a public key or a digest of the public key, or a combination of said initial interface identifier and a public key or a digest of the public key.

According to a third aspect of the present invention there is provided a method of avoiding the duplication of IP addresses in an IP network when a new host attaches to the network, the method comprising the steps of:

generating an Interface Identifier at the new host by combining a component or components and/or derivatives of the component or components using a one-way coding function and using the result or a derivative of the result as said interface identifier, said interface identifier forming part of said IP address;

sending a neighbour solicitation message from the new host to other hosts already attached to the access network;

receiving a neighbour advertisement message at the new host from each other host claiming to own said IP address, the or each neighbour advertisement message containing said component(s); and for each received neighbour advertisement message combining the component(s) and/or derivatives of the component(s) using said coding function; and comparing the result or a derivative of the result against the interface identifier part of the IP address, wherein if the result or the derivative matches the interface identifier the host from which the neighbour advertisement message is received is assumed to be authorised to use the IP address and if the result or its derivative does not match the interface identifier that host is assumed not to be authorised to use the IP address.

Preferably, said component(s) include a public key, a digest of a public key, or a derivative thereof. This allows the new host to learn a public key such that the new host may safely assume that the host sending the advertisement has used the public key to generate its IP address, and therefore the new host may assume that in order to be authorised the IP address the said other host must posses the corresponding private key.

Preferably, based on the assumption noted above, the new host may use any well known authentication protocol or other public key cryptography based protocol (such as zero knowledge protocols) to verify that the another host does currently possess the necessary private key. Preferably, successful running of the (verification) protocol is assumed to denote that the other host is authorised to use the IP address, and failure to successfully running the said protocol is assumed to denote that the other host is not authorised to use the IP address.

According to a fourth aspect of the present invention there is provided a method of verifying that a host coupled to an IP network is authorised to use an IP address which the host claims to own, and that the host is able to receive data packets sent to that address, the method comprising:

carrying out the method of the above first aspect of the invention to confirm that said host is authorised to use the IP address;

sending a challenge to the host using said IP address as the destination address for the challenge;

receiving a response from the host; and verifying that the received response is a correct response to the challenge.

Preferably, said challenge comprises a randomly generated number. More preferably, said challenge comprises said IP address concatenated with a randomly generated number. More preferably, said challenge is constructed by applying a one-way coding function to said IP address concatenated with a randomly generated number.

Preferably, said response comprises the challenge. More preferably, said response comprises the IP address concatenated with the challenge. More preferably, said response is constructed by applying a one-way coding function to said IP address concatenated with said challenge.

According to a fifth aspect of the present invention there is provided a method of authenticating a public key transmitted over an IP network from a first to a second host, the method comprising:

at said first host, generating an interface identifier using said public key and combining the interface identifier with a routing prefix to form an IP address for the first host;

sending said public key from the first to the second node over said IP network; and at said second node, verifying that said public key was the key used to generate said interface identifier.

According to a sixth aspect of the present invention there is provided a method of binding an IP address to a public key, the IP address comprising a routing prefix and an interface identifier part, the method comprising:

generating said interface identifier by combining one or more components and/or derivatives of the components using a coding function; and generating a certificate, signed with a private key of a public-private key pair, the certificate containing the interface identifier and ones of said components or said derivatives or further derivatives, such that the certificate can be authenticated using the host's public key, and ownership of the interface identifier can be verified by reconstructing the interface identifier using the contents of the certificate, and comparing the result against the true interface identifier.

DETAILED DESCRIPTION OF CERTAIN EMBODIMENTS

Figure 1:
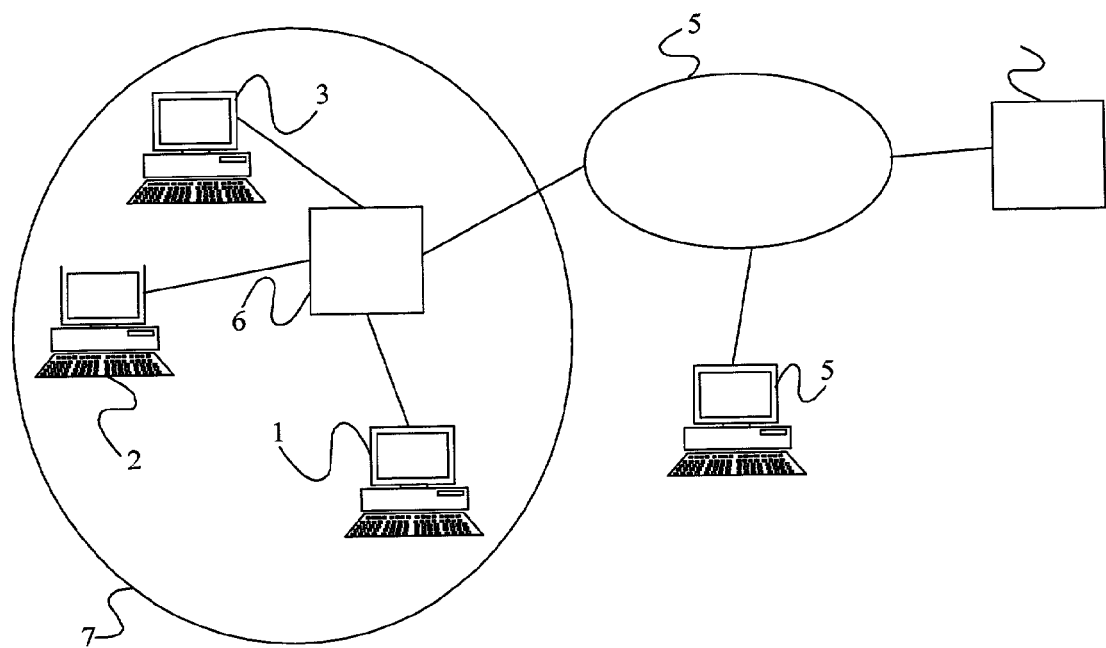
FIG. 1 illustrates schematically a network comprising a number of hosts coupled to the Internet.

There is illustrated in FIG. 1 an Internet communication scenario in which a number of user terminals or hosts 1 to 4 are coupled to the Internet 5. Hosts 1 to 3 are coupled to the Internet 5 via an access node 6 of an access network 7. Host 4 is connected by an access network which is not shown in the Figure.

Assume that one of the hosts 1 is new to the access network 7, and for that host the access network is a foreign network (and hence the access node 6 is a foreign agent). The host 1 discovers this fact by receiving a Router Advertisement message from the foreign agent (this message may be a message broadcast periodically by the foreign agent, or may be sent to the host 1 in response to a Router Solicitation message sent to the foreign agent from the host 1). The host 1 learns from the Router Advertisement message a routing prefix which uniquely identifies the foreign agent within the Internet. The host 1 then sends a Binding Update message to the home agent 8 of its home network 9, via the foreign agent 6, to inform the home agent of its new location. The home agent responds by sending a Binding Acknowledgement message to the host 1 via the foreign agent 6. As already explained above, the host 1 combines the routing prefix and an interface identifier to form an IP address. A new method for generating interface identifiers will now be described. This method has several advantages including:

binding of the interface identifier to the link layer address;
binding of the interface identifier to a public key;
it provides a means to block a Denial-of-Service attack during Duplicate Address Detection;
it provides a means to prove "address ownership" over a distance.

General Description of the Interface Identifier

The method described is based on a cryptographically strong one-way coding function. A one-way coding function is denoted with HASH( . . . ), and the particular one-way coding function used here is SHA-1 (although others may alternatively be used). In very general terms, the proposed method for generating an interface identifier is:

interface identifier:=HASH
(component1|component2|component3)

where ". . . | . . ." denotes concatenation, one of the components is a newly generated ("fresh") random number, and the other components are pieces of information that the node (or host) generating the interface identifier wants to bind the interface identifier to.

Given an interface identifier, it is computationally difficult to compute a set of components that hash to that interface identifier value. As the interface identifier is 64 bits long, 63 bits of which are significant in this context, on average it takes $(2^{63})/2=2^{62}$ operations to find such a set of components. Whilst it may be possible to reverse a hash value of that length with present day equipment, in practice it is likely to take several hundreds of years. Since the random interface identifiers are assumed to have a relatively short lifetime, at most in the order of days, this poses a negligible risk. Even taking into account likely future increases in processing power (doubling every 18 months), it will be many years before the risk becomes significant. Rather than trying to calculate components each time a NS packet is received by a malicious node, that node may choose to cache precomputed values. However, the storage space required for that task would be prohibitive.

The security of the method relies on the premise that nobody but the interface identifier generator can quickly and easily provide the component values upon request. Of course, a level of security could be provided be generating the interface identifier using only a single component. However, using multiple components gives other advantages, as will be discussed in the following sections.

In order to make use of the advantages provided by this method of generating interface identifiers, all of the participating nodes must comply with an "agreement". This agreement specifies a number of issues. Firstly, it specifies the method for generating interface identifiers. Secondly, it specifies that if a node can provide the components used to create an interface identifier, that node is more likely to "own" that interface identifier than a node that cannot provide these components. Thirdly, it specifies the structure and semantic meaning of the components, i.e. specifying that one of the components is a random number and the purpose of the other components.

Binding of the Interface Identifier to the Link Layer Address

In the basic IETF document [RFC2373], the link layer address is directly used to create the interface identifier. The construction method is reversible, making it possible to check that a link layer address and the interface identifier correspond to each other. That is, given an interface identifier, anybody can construct the corresponding link layer address, and vice versa. This is useful within a local link. However, in a subsequent IETF document [RFC3041] this link is broken in order to prevent the link layer address being sent outside of the local link and putting at risk the privacy of a host. Even though the link layer address is used to create the interface identifier, in practice this information is not utilised. That is, the random number that is used to generate the new interface identifier is never published or used in any way. Therefore there is no ability to infer the link layer address from a given interface identifier, or even to find out whether a certain node (identified by the link layer address) has in fact generated a given interface identifier.

The method described here partially re-creates the link between the link layer address and the interface identifier. As already explained, the interface identifier is generated from several components, (at least) one of which is initially known only to the generating node. Another of the components is the link layer address. When a node claiming to own an interface identifier discloses (as it must do) components that were used to create the interface identifier, other nodes learning the disclosed components will automatically pick out the link layer address from among the components. By checking that the components indeed hash to the interface identifier, they gain relative assurance that the generator of the interface identifier in fact wanted to use the given link layer address.

To provide for the binding of the interface identifier to the link layer address, it is sufficient to generate the interface identifier through interface identifier:=HASH(random|link layer address)

where "random" is a fresh random number and "link layer address" is the link layer address which the generating node wants to use.

Binding of the Interface Identifier to a Public Key

Traditionally, the inability to link an IP address with a public key (or other security related piece of information) is a severe problem to the security of several IPv6 related signalling mechanisms. For example, a node wanting to inform other nodes of a change in routing information for a specified address must show that it "owns" the IP address.

Three possible sources of such authorisation have been considered. Firstly, the authorisation may be locally configured. This works well for small to medium sized networks that are under a single administration. Secondly, there may be some kind of global infrastructure that provides evidence of IP address ownership. A special purpose PKI, such as secure reverse DNS, might provide such a service. However, establishing such a service is very hard in practice. Thirdly, authorisation may be based on mutual agreements. This is the so-called AAA approach, promoted by the IETF AAA working group. However, such a system asymptotically approaches the global infrastructure case as its coverage expands, leading to number scalability and trust transitivity problems. In summary, all of these three methods suffer from scalability limitations.

A fourth method which is proposed here uses cryptography and the fact that the IPv6 interface identifier part of an IPv6 address is long enough to have some cryptographic significance. The basic idea is to use the component-based-generation of the interface identifier to provide a cryptographically significant link between the interface identifier and a public key. That is, one of the components used in generating an interface identifier is a public key (or the hash of the public key, i.e. the cryptographic digest or "fingerprint" of the public key). As in the case of the link layer address, by disclosing the components, the node provides a claim that the generator of the interface identifier wants to use the specified public key. Thus, given only an interface identifier and the components from which it was generated, any other node can gain a reasonable assurance that the current user of the interface identifier indeed wants to use a given cryptographic key. The reverse proof, i.e. that the user of a public key wishes to use a given interface identifier, is provided by signing the interface identifier with the key. To provide these properties, it is enough to generate the interface identifier through:

interface identifier:=HASH(random|public key)

and sign it as certificate/signed message:={interface identifier|public key}$_{private\ key}$ where "...|..." denotes concatenation, "{...}$_K$" denotes a message signed with the key K, "random" is a fresh random number, public key is the public key or a cryptographic hash of it, and "private key" is a corresponding private key. For added assurance, the random number may be included into the signed message as follows.

certificate/signed message:={interface identifier|random|public key}$_{private\ key}$ A Complete Interface Identifier Generation Procedure For the purpose of further illustrating the invention and its applications, the following detailed implementation proposal is provided. This uses both the link layer address and a public key to generate the interface identifier.

The following operators are used here.
. . . |. . . denotes concatenation.
{. . . }$_K$ denotes a message signed with key K.
[. . . ]$_K$ denotes a message encrypted with key K.

1. Let II$_0$ be a 64-bit initial interface value, based on the link layer address of the host, generated exactly as specified in Appendix A of [RFC2373]. If no such value is available, II$_0$ must be a 64-bit zero.
2. Optionally, generate or obtain from an authorised third party a key pair <K+, K−>, where K+ is a public key and K− is a corresponding private key.
3. Calculate a digest of the public key, #K+:=HASH(K+). If no public keys are used, #K+ must be a zero value of equal length.
4. Generate an initial random value H$_N$, where N is the length of the series to be generated in the next step.
5. Generate a series of hash values H$_N$, . . . , H$_i$, . . . , H$_0$, where H$_{i-1}$:=HASH(H$_i$|II$_0$|#K+), by applying the function N times, i.e., until H$_0$ is generated.
6. Let the history seed H for the RFC3041 interface identifier generation algorithm be the last value in the hash series, i.e. H:=H$_0$
7. Continue as specified in Section 3.2.1. of RFC3041, (with minor modifications)
   Concatenate H|II$_0$', where H is the history seed generated in Step 6, and II$_0$' is a 64-bit zero value*
   Compute II':=MD5(H|II$_0$')
   Take the left-most 64-bits of the MD5 digest II' and set bit 6 to zero. The result is the interface identifier II.
   If more tries are needed (i.e. because of an authenticated collision), discard the last value of the hash series, thereby decrementing N by one: N:=N−1, and continue from step 6 above. Note that this is different from [RFC3041], where the MD5 function is simply applied once more.
8. If the optional public key value was generated or obtained in Step 2, create a self signed certificate, containing the interface identifier, the digest of the public key, the number of values in the hash series, the last value in the hash series, and the link layer address of the host, as follows:

CERT:={II,#K+,N,H$_0$}$_{K-}$

If the public keys are not used, an empty value must be used wherever the CERT would otherwise be used. The use of this certificate will be described below.

*) The reason why II$_0$' is zero instead of being II$_0$ is twofold. First, II$_0$ has been included in the generation of the H$_N$, . . . , H$_i$, . . . , H$_0$ series, thereby taking care of possibly bad random number generators as reasoned in RFC3041. Additionally, proving ownership with H$_1$, requires II$_0$ as well, making it still possible to locally link the ownership with the link layer address as reasoned in below. Second, leaving II$_0$ out from the computation of II makes it possible to initially only reveal H to a remote node. Revealing II$_0$ openly over remote links is undesirable, since it would effectively defeat the privacy goals of RFC3041.

In the method described here, the ownership of an interface identifier is primarily based on the generated hash series, and on revealing previous values from the hash series on demand. Since the demand should be low (almost non-existing unless an attack is occurring), it seems to be sufficient for most hosts. However, the method has been designed in such a way that the interface identifier is strongly bound to a cryptographic key, and the key may also be bound to the interface identifier. Furthermore, the method also strongly binds the link layer address into the interface identifier generation. The reasoning goes as follows.

When the hash series H$_N$, . . . , H$_i$, . . . , H$_0$ is constructed, in each step both the link layer address and a hash of a public key are used. In effect, this shows that the host wants to use the specified public key and the specified link layer address when using the interface identifier. Locally, this allows the nodes to ignore packets sent by other nodes using the node's interface identifier but "wrong" link layer address. In environments where changing the link layer address requires special privileges or hardware operations, this somewhat enhances security.

The inclusion of the public key has more profound effects. In particular, it means that the other hosts may directly learn a public key that they can safely assume the owner of an interface identifier to hold. That is, by using the hash of a particular public key in the interface identifier generation process, the node has strongly indicated that it wants that particular interface identifier to "own" the key. The reverse direction is shown by the self signed certificate, which basically states that the owner of the key wants to "own" the interface identifier. Together these two create a cryptographically strong two-way binding between the interface identifier and the public key. Indeed, this seems to be so useful that hosts might want to publish this information at an early stage using Neighbour Solicitation messages, and might want to restate this information in solicited Neighbour Advertisements. For this purpose, the Neighbour Solicitation (NS) and Neighbour Advertisement (NA) messages may contain the following information:

The public key K+ itself.
The self signed certificate CERT.
optionally, the initial interface identifier II$_0$ However, it is not needed for any purpose other than checking the link layer address, and such checking should most probably not be done unless the interface identifier ownership has been verified. The inclusion of K+ and CERT allows the receiving host to verify that the owner of the key K+ really wants to use the stated interface identifier.

The interface identifier generated using this method has many uses, a few of which are now considered in detail.

Denial-of-Service Prevention During DAD

During address autoconfiguration, it is possible that the newly generated interface identifier has a collision with an existing interface identifier. This is indicated by reception of a Neighbour Advertisement packet claiming that some other node already "owns" the identifier. In RFC3041, the method to resolve such a collision is to compute a successive interface identifier using MD5, and try again maximally five times. Unfortunately, this method does not work against malicious nodes that simply claim to own all interface identifiers.

Hash Based DoS Prevention

In order to prevent malicious nodes from claiming to "own" interface identifiers that a new node has generating, it is proposed that the DAD protocol is extended as follows:

a) All Neighbour Solicitation (NS) packets have the form

<TA, C, K+, CERT> where TA is the tentative address, C is a random number, K+ is the public key of the responding node, and CERT is the certificate generated in Step 8 above. Strictly speaking, the random number (used as a challenge) and the certificate are not needed, but they carry little overhead and slightly enhance security.

b) A revoking NA message, sent as a part of DAD, must have the form

<TA, TLLA, i, $H_i$, #K+, R> where TA is the address whose ownership the NA is claiming, TLLA is the target link layer address, $II_0$ is calculated from TLLA as specified in Appendix A of [RFC2373], i is the counter of the used hash values (for the first colliding NA, i is 1), $H_i$ is the i:th hash of the hash series, #K+ is the digest of the public key (or 128-bit zero value if public key crypto is not used), and R is $MD5(H_i|C)$. By publishing these values, the responding node shows that it "owns" the interface identifier. Additionally, if the optional public key pair was generated or obtained by the responding node when it generated the interface identifier, the message should include the public key and a signature, i.e.

<TA, TLLA, i, $H_i$, #K+, R, K+, SIGN> where K+ is the public key generated in Step 2 above, and SIGN is a signature over the whole packet, including the IP header, generated using K−.

To verify that the host sending the NA really owns the interface identifier, the receiving host computes the following:

1. Compute $H_0$ by computing i times $H_{i-1}, := HASH(H_i|II_0|\#K+)$
2. Let $H=H_0$
3. Compute $II':=MD5(H|II_0')$, where $II_0'$ is a 64-bit zero value
4. Compute II := II' bitwiseand 0xDFFFFFFFFFFFFFFF, which basically clears bit 6 of II' thereby yielding II
5. Check that TA=0xfe80000000000000|II, where 0xfe80000000000000 is the IPv6 link local address prefix
6. Check that $R=MD5(H_i|C)$ Furthermore, if the NA includes the optional signature, the receiving host may compute the following:

7. Check that #K+=HASH(K+)
8. Using K+, check that SIGN is a valid signature over the received packet For example, if i=1, the NA would contain

<TA, TLLA, 1, $H_1$, #K+, TIME, K+, SIGN> and the calculation goes as follows:

1. $H_0:=HASH(H_1|II_0|\#K+)$
2. $H:=H_0$
3. $II':=MD5(H|64\text{-bit zero})$
4. II:=II' bitwiseand 0xDFFFFFFFFFFFFFFF
5. Check that TA=0xfe80000000000000|II
6. Check that $R=MD5(H_i|C)$
7. Check that #K+=HASH(K+)
8. Check that SIGN=signature over the received packet If the checks pass, the soliciting node may assume that the claimant really owns the interface identifier, and that it should generate a new interface identifier.

There remains however a possibility of a replay attack. Instead of claiming to own the interface identifier when the new node creates it, an attacker can allow the node to establish the interface identifier and act only then. Once the node has established its ownership over the interface identifier, the attacker sends a NS requesting the interface identifier. According to this protocol, the rightful owner has to counter by revealing the so far secret value $H_1$, thereby blocking the attacker initially. However, the attacker can now claim again to own the interface identifier, this time by simply replaying the NA which revealed $H_1$. The rightful owner blocks this replay attack by revealing the previous $H_i$ value in the hash series. So far, the only strategy known to attack this problem is brute force, requiring in the order of $2^{(i*(length(H_i)-1))}$ operations, depending on the length of the values $H_i$. Additionally, if ever more than a couple of $H_i$ values are requested to be revealed locally, it is a good indication of an attack attempt.

Figure 2:
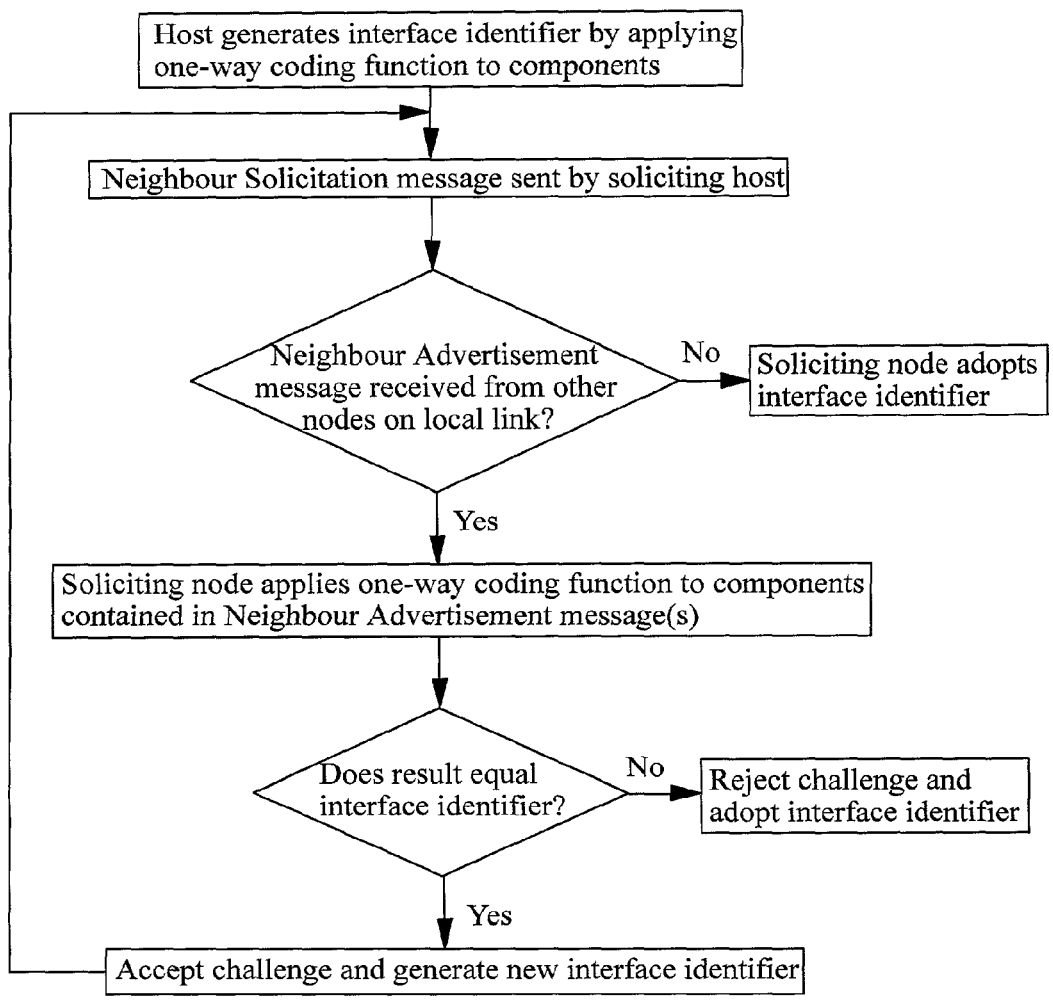
FIG. 2 is a flow diagram showing a Duplicate Address Detection process in the network of FIG. 1.

This method is further illustrated in the flow diagram of FIG. 2.

PK Based DoS Prevention

Another, unrelated way of resolving the problem of a replay attack is by use of one of the disclosed and strongly bound components. That is, whilst two nodes may claim to "own" a given interface identifier by providing the same disclosed components, only one can show that it "owns" one of the components and that particular component can be used to resolve the conflict. Here, the component that is used is the public key. Thus, if two parties claim to own the same interface identifier by showing the same components (or if the components are made public already), the dispute can be solved by one of the claimants showing its ability to use the private key that corresponds to the public key bound to the interface identifier.

There are several types of public key cryptography, including conventional public key encryption such as RSA, public key signature algorithms such as DSA, and even zero knowledge protocol. For the purposes of proving ownership over an interface identifier, any such method will do. That is, the only requirements are that it is possible to express a public key by means of a cryptographic digest, and to provide timely evidence that the claimant indeed has access to the private key. The usual way of providing such timely evidence is to run an authentication protocol.

Link Layer Address Based DoS Prevention

Depending on the nature of the link layer communication used, it may also be possible to use the link layer address to resolve conflicts (and defend against replay attacks), or as the only means of checking interface identifier ownership locally. That is, if the used communication medium has secure link layer addresses, the ability to bind a link layer address to an interface identifier, as discussed above, is enough to make sure that only legitimate interface identifiers are used.

Extending Interface Identifiers to Routable Addresses

So far we have only discussed interface identifiers. However, as specified in [RFC3041], randomly generated interface identifiers are only assumed to be locally unique. Thus, it is possible, and even probable, that there will be colliding interface identifiers in the global Internet. (According to the "birthday paradox", given a set of about 2^(63/2) or about 3 billion interfaces, the probability of such a collision is about 50%.) Thus, even though we do not allow collisions locally by requiring uniqueness in the (extended) Duplicate Address Detection procedure, they must be tolerated in the non-local case. Consequently, in the non-local case it is not wise to base the authorisation on the interface identifier alone.

Challenge/Response

A basic problem in packet based communications is the ease of spoofing the source address. That is, unless global ingress filtering is used, it is easy to send packets where the source address has no relevance. A basic level of security may be achieved by sending a challenge back to the source address specified in the packet, and waiting for a response. The originator of the packet is able to respond with an appropriate response only if it is able to receive packets sent to the address. This method is well known, and used in for example the so-called cookie mechanisms in several protocols.

The basic, hashing-only based method for providing proof of interface identifier ownership combines the challenge/response approach with the simple disclosure-of-components approach or the more complicated repeated-disclosure-of-components approach (both of which have been described above). Furthermore, the combination is preformed in such a way that the party verifying ownership does not need to perform heavy computations. The low computational intensity of the process prevents some potential resource exhausting Denial-of-service attacks.

The basic idea is that a claimant first sends the address to be checked, including the interface identifier, and the components from which the interface identifier was created. This is the first message in the protocol. The verifier can check the components, thereby making sure that the claimant either has generated the interface identifier itself, or has learned it from the original node. However, the protocol is designed in such way that, even though there are probably a large number of nodes that have learned this first set of components, the number of nodes that may have learned the second set of components, used later, is much smaller.

Once the verifier has checked the interface identifier and the components, it sends a challenge to the address being verified. In principle, the challenge could be a simple random number. However, here the random number is combined with the interface identifier to be verified and the components, thereby allowing the same random number to be used repeatedly. The challenge is the second message in the protocol. When the claimant receives the challenge, it generates a response. The response forms the third and final message of the protocol. In generating a response, their are two possible options:

a) The claimant uses the interface identifier and the same set of components that it has disclosed already in the first message interface identifier:=HASH(components)

and sends the interface identifiers and components (because these were not retained by the verifier).

b) In generating the response, the claimant uses the interface identifier and a previous set of components, i.e. a set of components that were used in generating the components disclosed in the first message interface identifier :=HASH(components1)

components1:=HASH(components2)

and sends the interface identifier and components 2.

Both of these approaches have their advantages and disadvantages. The main benefit of a) is that the second set of components need not be disclosed, thereby "saving" them for later use. However, the drawback is that anyone knowing the first set of components can generate the response. Conversely, in b) the use of the second set of components makes that set of components public information. Thus, after they have been used once, any host that has been able to learn the first set of components has most probably also learned the second set of components. Thus, there is almost no added security.

The first method a) is preferred here, where the same set of components is used in the first and last message. This method provides the following assurances:

The claimant is able to receive messages sent to the address being verified. This property may be achieved by a simple challenge/response protocol.

The claimant has either itself generated the set of components which the interface identifier has been generated from, or has learned these somehow.

Thus, the added level of security (when compared with basic/challenge response) lies in the need to know (or learn) the components. Unfortunately, learning the components is not very hard. Fortunately, in the protocol described here the components function only as a first layer of protection, and the actual ownership is proved only through public key cryptography.

An attacker may have learned the components by at least three different methods. It may have learned them because it is on the same local link as the node that generated the components, because it is able to eavesdrop the traffic between the node that generated the components and some other remote node, or because it has learned them from the original node by running this very protocol.

If an attacker has learned the components because it is on the same local link as the generator of the components, it will find it difficult to use the interface identifier. The original generator of the components is still considered to be the owner of the interface identifier. If the attacker attempts to send packets with the given interface identifier, it is easily detectable. If the original node moves to another local link, or if the attacker moves to another local link, the situation is similar to the case when the attacker has learned the components through eavesdropping or by running the verification protocol.

In the other scenario, the attacker and the actual generator of the components are on different links. Therefore, they will have different routing prefixes. Now, since the original node and the attacker have different routable addresses, the attacker using the same interface identifier as the original node cannot be considered as an attack. The attacker will be able to run the basic challenge/response protocol, as described in this section, but that does not and should not help it much.

Figure 3:
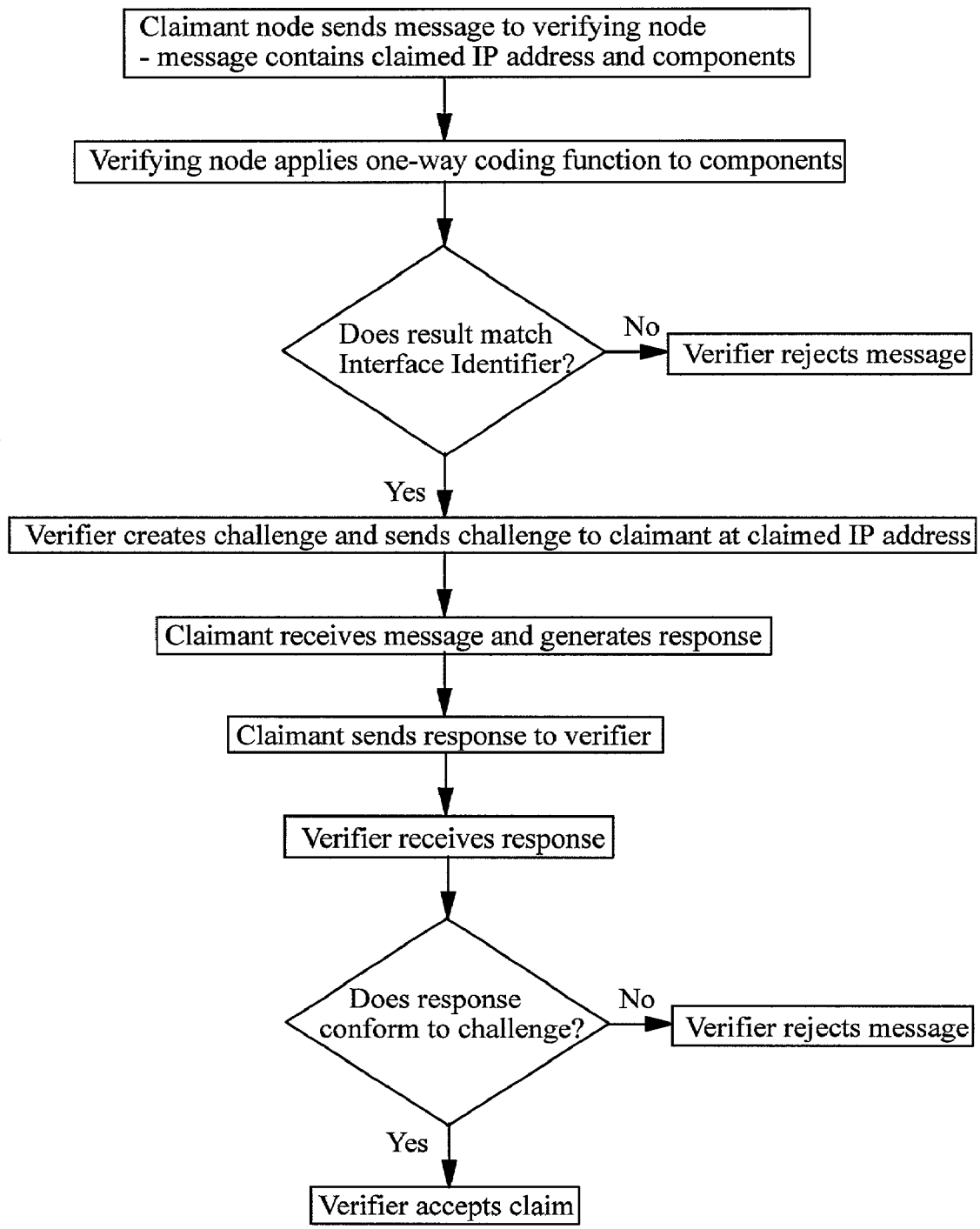
FIG. 3 is a flow diagram illustrating a method of performing a binding update in the network of FIG. 1.

This method is further illustrated in the flow diagram of FIG. 3.

Combining Challenge/Response and Public-Key Based Authentication

In the local case, the question was very much about the uniqueness of the interface identifier. As discussed already, in the global case interface identifiers need not be and are not generally unique. Thus, there is no point trying to ensure or prove that. Similarly, the link layer address has no relevance in the global scale. Instead, the ability to strongly bind a public key and an interface identifier to each other is very important. However, since public key operations such as creating signatures and verification of signatures is expensive, a preferred method is one where the one-way coding functions are used first, as the "front barrier" which makes attacks harder, and public key functions are used only after that. Using public key functions directly might open possibilities for resource exhausting Denial-of-Service attacks.

In the public key based method, the claimant first sends a packet containing the address to be verified, including the interface identifier, and the components from which the interface identifier was generated. However, these components do not yet contain any information about the public key of the claimant, since the verifier is not expected to create a state or otherwise remember that it has ever received this first message. The verifier creates a challenge as before. However, in addition to the challenge, it may send its public key to the claimant as an additional piece of information. In this case, the public key is best sent as a self signed certificate. It is expected that the verifier has this certificate ready so that sending it requires only appending it to the messages.

The next step involves several options, depending upon what is required. If the verifier has provided its public key, the claimant may use it. In any case, the claimant must use its own private key on the challenge, effectively creating a multi-layered response. That is, the claimant shows that it was indeed able to receive the challenge and act on it. It must be very "cheap" for the verifier to verify this, since otherwise an attacker might send false response messages, the processing of which would consume a lot of resources from the verifier.

A further layer of security is then created using the public key. Here the verifier must first be able to check that there is indeed a binding between the interface identifier and the public key. However, once the information about the public key is conveyed to the verifier, there are several standard options how to utilise it.

To summarise, the method has the following "layers" of protection 0.1 The verifier can verify, very cheaply, even before sending a challenge, that the claimant knows a set of components that correspond with the interface identifier.

0.2 The verifier is able to construct a challenge, cheaply, without needing to save state information.

1.1. The verifier can verify, cheaply, that the claimant was able to receive the challenge.

1.2. The verifier can verify, cheaply, that the claimant still knows the same set of components that were used in the first message.

2.1. The verifier can verify, cheaply, that the public key given by the claimant is indeed one of the components that were used in generating the interface identifier.

2.2. The verifier can verify (expensively) that the claimant does possess the private key corresponding to the public key.

Detailed Protocol Description

We describe the mechanism in terms of Alice and Bob, where Bob wants to prove Alice that he "owns" the IP address TA. The following three-message protocol is used. Additionally, a 0-step is needed to specify how Bob has generated the address.

0. Bob generates a new IP address TA, using the method outlined above.
1. Bob wants to prove to Alice that he owns the address TA. To do so, he sends Alice a message containing the following:

MSG1=<TA, $H_0$, #K+, N> where

TA is the IP address whose ownership Bob wants to prove, consisting of a routing prefix RP and interface identifier II, $H_0$ is the $H_0$ that Bob used during generation of II,

K+ is a hash of a public key that Bob used when generating $H_0$, and

N is a random number (nonce) which Bob may use to identify the reply that he is expecting to receive from Alice. Since N may be any number, if Bob does not want to use a random number, he can use any number, e.g. zero.

2. Alice receives the packet and sends a challenge.

2.1. Alice checks that
   interface_identifier(TA)=MD5($H_0$|64-bit zero) bitwiseand 0xDFFFFFFFFFFFFFFF.

This proves that Bob knows the right value of $H_0$, either because he has generated it himself or because he has learned it by eavesdropping or by running this very protocol beforehand. Already this may be considered as a weak proof of ownership of the interface identifier.

2.2. Alice creates a challenge $C:=MD5(P|H_0|\#K+|N|TA)$ where P is a random number (a nonce). A single nonce will serve for several challenges, and therefore Alice need not create any state.

2.3. Alice sends a packet to the address TA, the packet containing the challenge C. It is important to note that this message is sent to the address TA, since it checks that Bob is reachable through TA. Optionally, the packet may also contain Alice's self signed certificate $CERT_A=\{II_A, \#K_A+, N_A, H_{A,0}\}_{KA-}$ MSG2=<N, C> or MSG2=<N, C, $K_A+$, $CERT_A$>

3. Bob receives the challenge and sends a response.

3.1. Optionally, Bob checks N to see that the challenge has indeed been sent in a response to his initial packet.

3.2. Bob computes response $R:=MD5(C|TA|H_0|\#K+|N)$.

3.3. Optionally, Bob extracts Alice's public key $K_A+$ and checks $CERT_A$.

First Bob verifies the following:

$II_A$ matches with the interface identifier that Alice used as the source IP address in the IP header when sending MSG2

$II_A$=MD5($H_0$|64-bit zero) bitwiseand 0xDFFFFFFFFFFFFFFF $\#K_A+$=HASH($K_A+$)

$CERT_A$ contains $\#K_A+$ $CERT_A$ is validly signed

If this verification fails, Bob continues as if the optional parts $K_A+$ and $CERT_A$ were not received at all.

3.4. If Bob received Alice's public key and the verification in Step 3.3. succeeded, Bob prepares a secret key to be shared between himself and Alice.
   create a secret symmetric key $K_{AB}$, to be shared between Alice and Bob
   encrypt, using Alice's public key, a message containing the newly created key $K_{AB}$, the $II_0$ that Bob used in creating $H_0$, and the $H_1$ that Bob used in creating $H_0$. This is the secret part S, which only Alice will be able to open.

$$S:=[II_0, K_{AB}, H_1]_{KA+}$$

If S is not generated, it is replaced with an empty string.

3.5. Bob sends a packet to Alice, containing the response R. Additionally, this message must contain the same TA, $H_0$, #K+ and N as MSG1 contained.

$$MSG3 = <TA, H_0, \#K+, N, R, S>$$

Optionally, the message may also contain Bob's public key K+, Bob's certificate CERT, and signature SIGN.

$$MSG3=<TA, H_0, \#K+, N, R, S, K+, CERT, SIGN>$$

The signature SIGN is a signature over the rest of the message, generated using Bob's private key K−.

4. Alice receives the response and checks it.

4.1. Since Alice has not saved any state, she first rechecks that the interface identifier is valid with respect to $H_0$.
   interface_identifier(TA)=MD5($H_0$|64-bit zero) bitwiseand 0xDFFFFFFFFFFFFFFF.
   If this does not hold, Alice simply drops the packet.

4.2. Knowing P, Alice recomputes C using information from the received message $$C':=MD5(P|H_0|\#K+|N|TA)$$

and checks that the response R has the expected value $$R=MD5(C'|TA|H_0|\#K+|N).$$

If this does not hold, she assumes that Bob's claim is invalid. On the other hand, a valid claim is a proof that Bob is able to receive packets sent to TA.

4.3. If the message contained the optional part, i.e. Bob's public key K+, his certificate CERT and the corresponding signature SIGN, Alice checks the following:
   II in CERT matches with the interface identifier of TA
   #K+=HASH(K+)
   CERT contains #K+
   CERT is validly signed
   the signature SIGN is valid
   This proves that the owner of the key K+ wants to use the address TA, and that Bob owns the key K+ since he knows K−.

4.4. If the message contains the secret part S, Alice decrypts S using her private key $K_A-$, revealing $II_0$, $K_{AB}$ and $H_1$. Alice checks the following:

$$II=MD5(HASH(H_1|II_0|\#K+)$$

This proves that the generator of II wanted to use a public key whose digest is #K+ and has a link layer address which matches $II_0$. This closes the loop from II to K+ and back from K+ to II. The fact that $II_0$ is revealed is not usually a problem since the message is encrypted.

If all of the protocol verifies, including the optional step 4.3., Alice has learned that Bob is currently reachable at TA and that K+ is the public key that Bob used to generate TA. Additionally, Alice knows that Bob's link layer address is $II_0$, but she doesn't do much with that information.

To summarise, the benefits of the schemes presented here are the following:

The strong binding between the link layer address and the interface identifier, as specified in [RFC2373] and broken in [RFC3041], is partially re-created in a way that does not compromise the privacy goals of [RFC3041].

A new binding is created from an interface identifier to a public key.

A means to block a denial-of-service attack during IPv6 autoconfiguration [RFC2462] is added to the Duplicate Address Detection (DAD) procedure.

A means to "prove" interface identifier ownership for the purposes of modifying local routing information, as needed in for, e.g. Mobile IPv6 Binding Updates, is presented.

Certain key features of the schemes are as follows:

By forming the interface identifier part of an IPv6 address through applying a one way function on components, at least one of which is initially secret, allows a later disclosure of these components to act as a proof of interface identifier ownership.

It is proposed to apply the one way function multiple times on the components, thereby providing security against attacks where an attacker uses previously disclosed components.

By forming the interface identifier part of an IPv6 address through applying a one-way function on components, specifying semantic meaning to these components, and disclosing these components, allows the interface identifier to act as a cryptographic token, denoting values for the semantically significant components on behalf of the user of the interface identifier.

In particular, the link layer address may be one of the semantically meaningful components used. The security relevance of including the link layer address depends on the particular implementation of the local link.

In particular, a public key or a message digest of a public key may be one of the semantically meaningful components used. Potentially, this has very large security consequences since it allows a key and an IPv6 address to be linked without any external infrastructure, such a PKI or an AAA infrastructure.

By combining the known challenge-response method of checking reachability with the ability to bind a public key to an interface identifier makes it possible to check, over the Internet, that somebody claiming to have control a particular interface identifier really has, with high probability, that control.

By combining the repeated generation of the interface identifier from components allows the checking of interface identifier ownership to be performed in such a way that the verifier has some protection against resource exhausting denial-of-service. This DoS protection is created by limiting the number of nodes that may cause the verifier to perform costly public key computations.

It will be appreciated that various modifications may be made to the above described embodiments without departing from the scope of the present invention.

The invention claimed is:

1. A method of operating an IP network comprising:
   receiving one or more components from a host coupled to the IP network, the host having an IP address, the IP address comprising a routing prefix and an interface identifier part;
   applying a one-way coding function to the or each component and/or derivatives of the or each component;

comparing a result or a derivative of the result against the interface identifier part of the IP address; and asserting that the host is authorized to use the IP address which the host claims to own.

2. A method according to claim 1, wherein said components comprise a hash value being one of a sequence of related hash values.

3. A method according to claim 2, wherein said components comprise a counter value which identifies the position of the received hash value in said sequence.

4. A method according to claim 2, wherein said series of hash values are derived at the host by applying a one-way coding function to a seed value and a public key or a digest of the public key.

5. A method according to claim 2, wherein said series of hash values are derived at the host by applying a one-way coding function to a seed and an initial interface identifier.

6. A method according to claim 2, wherein said series of hash values are derived at the host by applying a one-way coding function to a seed, a public key or a digest of the public key, and an initial interface identifier.

7. A method according to claim 2, and comprising deriving a hash value from the received hash value to provide a derivative to which the one-way coding function is applied, the derived hash value being the last hash value in the sequence.

8. A method according to claim 7, wherein in the event of a first IP address verification, the hash value received from the host is the hash value preceding the final hash value in the sequence and for each subsequent verification process, the next previous hash value must be received.

9. A method according to claim 1, wherein said components comprise a public key or a digest of a public key generated by said host or obtained by said host from another authorised party or a fixed bit sequence of the same length.

10. A method according to claim 1, wherein said components comprise an initial interface identifier which corresponds to or is derived from a link layer address of the host, or a fixed bit sequence of the same length.

11. A method according to claim 1, wherein said components comprise an initial interface identifier which corresponds to or is derived from a link layer address of the host, or a zero bit sequence of the same length.

12. A method of verifying that a host coupled to an IP network is authorised to use an IP address which the host claims to own, and that the host is able to receive data packets sent to that address, the method comprising: carrying out the method of claim 1 to confirm that said host is authorised to use the IP address; sending a challenge to the host using said IP address as the destination address for the challenge;

receiving a response from the host; and verifying that the received response is a correct response to the challenge.

13. A method according to claim 12, wherein said challenge is a randomly generated number and the response comprises the challenge.

14. A method according to claim 12, wherein said challenge comprises said IP address concatenated with a randomly generated number, and the response comprises the IP address concatenated with the challenge.

15. A method according to claim 12, wherein said challenge is formed by applying a one-way coding function to said IP address concatenated with a randomly generated number, and the response is formed by applying a one-way coding function to the IP address concatenated with the challenge.

* * * * *